Oct. 16, 1956  J. P. BOLANOWSKI ET AL  2,766,765
METHOD AND APPARATUS FOR MAINTAINING UNIFORM FLOW RESISTANCE
Filed April 30, 1952
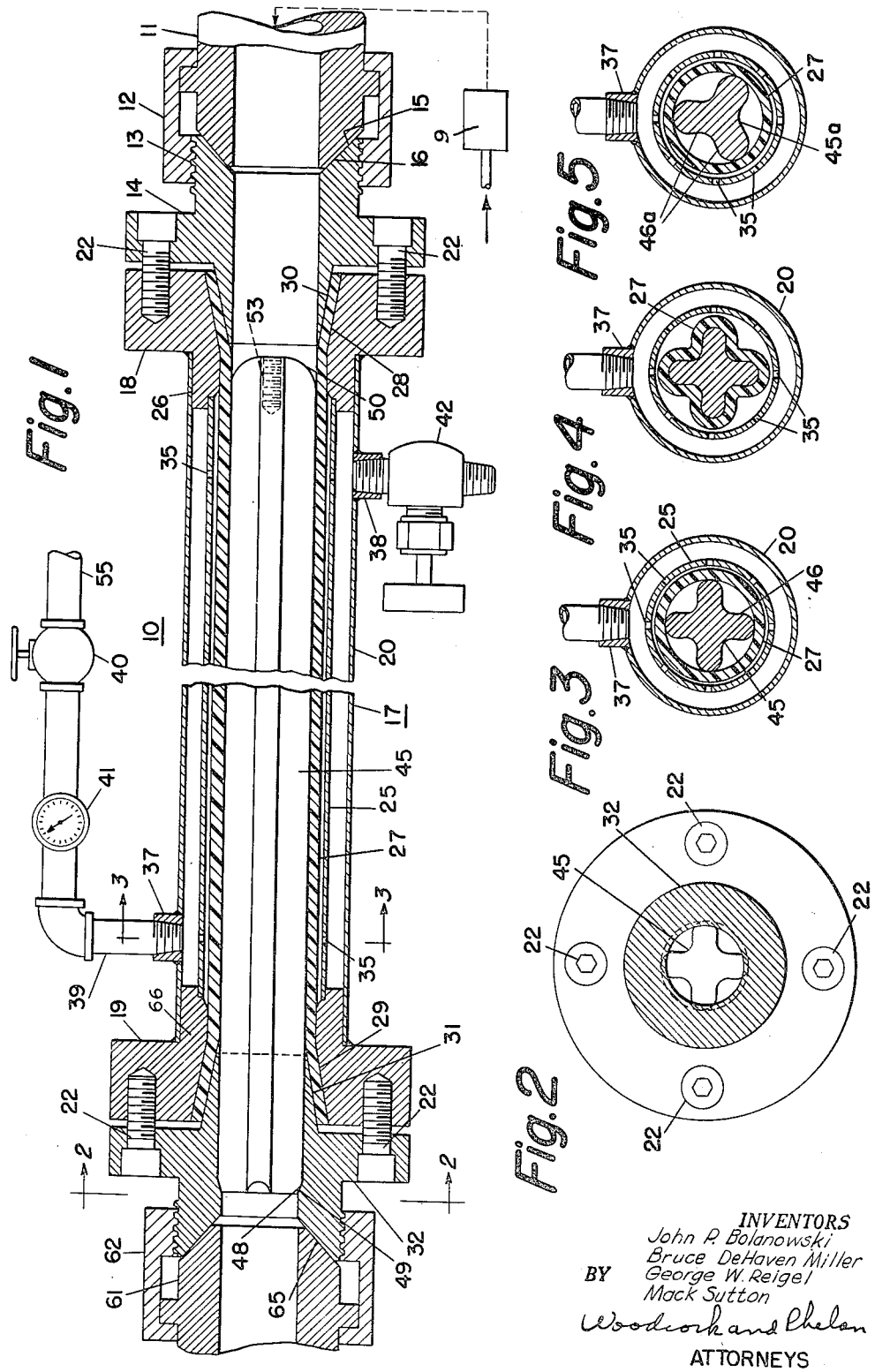
INVENTORS
John P. Bolanowski
Bruce DeHaven Miller
George W. Reigel
Mack Sutton
BY
Woodcock and Phelan
ATTORNEYS

United States Patent Office 2,766,765
Patented Oct. 16, 1956

2,766,765

METHOD AND APPARATUS FOR MAINTAINING UNIFORM FLOW RESISTANCE

John P. Bolanowski, Jeffersonville, Ind., Bruce De Haven Miller, Louisville, Ky., and George W. Reigel, Clarksville, and Mack Sutton, Valparaiso, Ind., assignors, by mesne assignments, to National Cylinder Gas Company, Chicago, Ill., a corporation of Delaware Application April 30, 1952, Serial No. 285,342

8 Claims. (Cl. 137—14)

The present invention relates to a method and apparatus for maintaining at a predetermined value the flow resistance offered to a flowing stream and has for an object the provision of a method of and apparatus for developing a predetermined back pressure upon the flowing stream by control of the flow resistance without degradation or modification of the stream, whether it be gaseous-laden or whether it include a multiplicity of solid, discrete, particles.

In the processing of compressible material such as marshmallow, cake batters, latex, egg white, as well as work-sensitive materials, such as foams and emulsions, it has been found that the quality of the product is dependent upon the pressure applied to the discharge of the material from the mixing zone wherein aeration or emulsification is produced. In order to control the discharge conditions and maintain a predetermined quality of the end product it is desirable that means be provided for imposing a desired back pressure. While various types of known valves have been employed for this purpose, such valves have the undesirable effect of producing sudden changes in pressure at various points within the valves. Such pressure changes may be produced by even small irregularities in the flow channel or by sudden changes in direction of the stream or flow path through the valve and result in degasification of the product. However, by virtue of the present invention, a method and apparatus are provided for controlling the back pressure on a flowing stream in manner to produce any desired uniform flow resistance without sudden change in flow conditions and resultant degasification.

In the continuous processing of food products containing discrete particles such as cream-style corn, vegetable soup, and confections containing nuts, there arise several problems. First, in many cases it is desirable to pass such foods through a sterilization zone wherein high temperature is attained without degradation of product by maintaining the pressure therein well above atmospheric pressure. To maintain that pressure high it is necessary that a flowing stream of the food product develop the needed back pressure. However, if flow restrictions of the type heretofore utilized be employed, the discrete particles are damaged. If they be solid fragments of cooked potatoes they may disintegrate completely and if they be of more rugged character, such as nuts and the like, they form dams at the region of the flow restriction, causing wide changes in the back pressure and with resultant degradation of product in attainment of pressures adequate to break the dam.

In accordance with the present invention, a uniform back pressure is maintained on the mixing or sterilization zone for the food products regardless of whether the food product be gaseous-laden or filled with discrete particles. If the stream be of a viscous character with viscosity changing with temperature, in accordance with the present invention back pressure is maintained substantially constant even though there be relatively wide changes in the viscosity.

In the event it is desired to terminate flow of the product, the flow controller in accordance with the present invention will, without damage to discrete particles, either move them into zones or will accommodate them during operation to shut off the flowing stream or effectively to close the flow passage. Thus, in accordance with the present invention there may be provided a continuous process from the mixing zone for the food products through the cooking and sterilization zones and thence through a cooler or chiller with accurate and automatic control of the back pressure as desired between the separate treating zones greatly to enhance the product and to increase the overall output.

In a preferred form of apparatus embodying the method of the present invention, there is provided a back pressure controller including a variable volume tube having a flow passage of length many times greater than its effective maximum opening or diameter to provide the flow characteristics of a tube in contrast with those of a nozzle and having a flexible wall movable inwardly and outwardly of the passage to change the volume and cross-sectional area of the flow passage uniformly throughout the length of said passage.

Further in accordance with the invention, an enclosure is provided for the flexible wall coextensive with the major length thereof and pressure-developing means are provided to establish a predetermined pressure within the enclosure to permit a balance at a preselected value of internal pressure on the flexible wall of the flow control tube against the external pressure applied to the outer surface of the flexible wall within the enclosure.

Still further in accordance with the present invention, the length of the flow channel through the variable volume tube, at least four times its diameter, is arranged to establish a resistance to flow of between about one-third and two-thirds of the desired back pressure while the remainder of the resistance to flow is developed by application of a predetermined pressure in the enclosure surrounding the flexible wall to decrease slightly the flow passage. By such a division of the total back pressure, there is always connected to the outlet of the sterilizing or mixing apparatus a flow-retarding tube which in contrast with a nozzle provides at least one-third to two-thirds of the required back pressure without application of pressure around the flexible wall.

In a preferred form of the invention, means are provided for subdividing a flowing stream whose pressure is to be controlled into a plurality of elongated flow paths of variable volume and further means are provided for simultaneously varying the volume of each of these paths to change the effective area of the whole flow path and the total flow resistance of the stream. In the preferred form, a mandrel having a plurality of radially extending arms or lobes is provided within the variable volume tube in such position that the flexible wall contacts the periphery of the arms of the mandrel so that a plurality of parallel flow paths are established between the flexible wall and the arms of the mandrel.

Further objects and advantages of the present invention will become apparent from the following detailed description taken in conjunction with the accompanying drawings which form an integral part of the present specification, and in which:

Fig. 1 is a cross-sectional view of one form of apparatus which may be used in carrying out the invention and particularly illustrating the back pressure flow controller;

Fig. 2 is an end view partially in section taken in the direction of arrows 2—2 in Fig. 1;

Fig. 3 is a cross-sectional view taken in the direction of arrows 3—3 in Fig. 1, particularly illustrating the parallel flow paths through the variable volume tube of the flow controller;

Fig. 4 is a view similar to Fig. 3 illustrating the variable volume tube in a shut-off position; and Fig. 5 is a view similar to Fig. 3 illustrating a modification of the mandrel within the variable volume flow-controlling tube.

Referring now to the drawings and in particular to Fig. 1, there will now be described the method of the present invention and a preferred form of apparatus, in itself new, and also adapted for the performance of the method. As already explained, product degradation results from the failure to maintain within rather strict limits the pressure upon certain kinds of materials, such as marshmallow, cake batter, latex, egg whites, etc., and considerable difficulty has been experienced in bringing a system producing such materials "on stream." Likewise, in a continuous flow system handling products containing discrete particles, there has been difficulty in maintaining predetermined and uniform pressure differences between different treating zones in the process when the flow is "on stream." In accordance with the present invention, that difficulty has been solved by providing a variable volume tube 27 whose length in comparison with its diameter, or more strictly speaking, the effective cross-sectional area of the flow passage or passages thereof, is great enough for the development of a large proportion of the back pressure required to prevent loss of air or gases within such materials as marshmallow, latex or egg whites, or to prevent wide pressure variations on streams containing discrete particles, such as vegetable soup. In starting up the process the flexible wall of the tube 27 will, by uniform application of pressure to the exterior surface thereof be firmly pressed against a mandrel 45 extending lengthwise thereof. Thus, the tube as shown in Fig. 4 wil lbe closed not only circumferentially of the mandrel, but also throughout the greater portion of its length.

If materials of the foregoing type are introduced into the end of pipe or tube 11, only the left-hand end of which appears in cross section in Fig. 1, and such materials are forced under pressure from material treatment zone or apparatus 9 toward the closed tube, it will be seen that the flexible-walled section of the tube will be gradually opened. The force required to move the material through the tube will be determined by two factors, first, the length of the tube which determines the drag force or the back pressure required, and secondly, the amount of pressure applied circumferentially and lengthwise of the tube. As shown in Fig. 1, air under pressure is admitted to the space surrounding the tube through pipe 55 under control of valve 40. A pressure-indicating device such as gauge 41 is preferably provided to predetermined this pressure at any desired value. Thus, the movement of the material through the tube progressively opens the tube and establishes several flow areas, such for example as the four flow areas shown in Fig. 3, defined by the four arms or lobes 46 of mandrel 45 arranged in the shape of a clover leaf or cruciform. If, as shown in Fig. 5, the mandrel 45a is provided with but three lobes 46a, there will be three flow passages, and with a differing number of lobes, differing numbers of flow passages will be provided. While the radial lengths of arms 46 are shown as being equal to the radius of tube 27, it is, of course, to be understood that the radial length of each of the lobes 46 for the mandrel 45 may be less than the inner radius of the tube 27, in which case there will be a continuous flow passage circumferentially of the tube instead of subdivided flow as already described. It is to be particularly observed in both Figs. 3 and 5 that the inner circumference of flexible wall 27 is equal to the circumference or perimeter of the cross section of mandrels 45 and 45a respectively, so that the wall may smoothly conform to the arms 46 and 46a to close the passages through tube 27.

From the foregoing explanation it will be seen that the progressive opening of the flexible tube is highly effective in preventing loss of material due to product degradation and it is also of advantage in that with the pressure established from the source 55 any substantial decrease of pressure on the material results in automatic closure of the flexible tube and thus prevents loss of material which would otherwise result from a tendency of the system to purge itself.

The manner of applying uniform pressure to the flexible-walled tube 27 is shown in Fig. 1 as accomplished by the provision of an impervious outer housing or wall 20 which is preferably cylindrical and forms a pressure chamber in conjunction with the axially extending shoulders 26 and 66 of flanges 18 and 19 and the outer surface of the flexible wall or tube 27.

In order to limit the maximum diameter of tube 27, there is interposed a cylindrical enclosing tube 25 provided with a plurality of radial perforations 35 at each end thereof for ingress and egress of fluid under pressure. Thus, the inner wall of enclosing tube 25 provides strong backing for the flexible wall member 27 and the perforations 35 prevent rupture of wall 27 in the event of sudden loss of pressure from source 55 or increase in product pressure with sudden movement of the wall from a partially collapsed position around arms or lobes 46 of mandrel 45 to its maximum open position, as might well occur if fluid pressure were trapped within restricted portions of the pressure chamber between the wall of tube 25 and flexible wall 27. As used hereinafter, the variable volume section or regulating section designated generally as 10 includes flexible tube 27 and its enclosure means or surrounding chamber means 17 defined by tubes 20 and 25 and end flanges 18 and 19.

As mentioned hereinbefore, it is desirable that the flow channel through flexible tube 27 be free from sudden changes in cross section in avoidance of deaeration or deemulsification of the product flowing therethrough. Additionally, where the material contains discrete particles, such as pieces of vegetable, fruit or nut meats, such abrupt changes in cross section may permit the particles to settle out or form blocking bridges which foul the flow passages through the tube. For this reason, mandrel 45 in the present arrangement is supported as a cantilever beam at the downstream end of the tube 27 by a shoulder 49 of elongated, conical taper provided in a portion of the passageway through flange 32. In this way the tapered end 48 of mandrel 45 engages shoulder 49 and in conjunction with the passageway through flange 32 supports the mandrel 45 within the flexible wall tube 27 without introducing abrupt changes in the cross-sectional area of the flow path. It is to be observed that the lobes 46 of mandrel 45 are the portions which support the mandrel in conjunction with the through-bore of flange 32. Product flow through the tube, from right to left as seen in Fig. 1, operates to maintain end 48 of mandrel 45 in its cooperative relationship with the flange 32.

The leading end of mandrel 45 is provided with a rounded or spherical end 50 which likewise reduces the effect of a sudden change in cross section presented to the material flowing through the tube. It is to be noted particularly that since both mandrel 45 and flexible wall 27 are quite long, of length at least four times the maximum diameter of the flow passage, any turbulence introduced by the presence of mandrel 45 in the flow path is substantially eliminated before the product is discharged from tube 27. For the purpose of permitting mandrel 45 to be inserted into or withdrawn from engagement with the flexible wall 27, a tapped hole 53 is provided in end 50 of the mandrel so that a screw threaded tool may be inserted therein.

In order to secure the flexible wall 27 of the tube 10 in a pressure-chamber forming position with respect to the enclosing tube 25 and the outer housing 20, so that pressure exerted exteriorly of flexible wall 27 will operate to conform smoothly the walls around the lobes or arms 46 to close the flexible wall tube substantially throughout its length in avoidance of localized turbulence, the ends of flexible wall 27 are expanded outwardly into engagement with the tapers 28 and 29 formed respectively in the end flanges 18 and 19. The ends of flexible wall 27 are maintained in this outwardly expanded condition by the tapered ferrules 30 and 31 respectively formed integrally with flanges 14 and 32. It is to be noted that the throughbores formed respectively in flanges 14 and 32 give a smooth transition to the product flowing through these bores and in passing into and out of tube 27. To assure that the pressure chamber surrounding flexible wall 27 is made fluid-tight, the flanges 14 and 18 as well as flanges 19 and 32 are secured together as by a plurality of screws 22 tapped and threaded respectively into flanges 18 and 19.

The tube or wall 27 is preferably constructed of a material such as neoprene, polyethylene, polyvinylidene or other plastics or elastomers which will not react chemically or impart a flavor to the product flowing therethrough. The physical properties of the wall may be varied somewhat depending upon the product being controlled. While preferably the flexible wall is inelastic, it need not be. In the case of aerated or emulsified products, there will not be degradation or damage to the product whether the tube be elastic or inelastic. In the case of products such as vegetable soup containing fragile discrete particles (e. g. cooked potato cubes), it is preferred that the material of the tube be as limp as possible. By constructing the flexible wall from a limp material, such as a thin-wall tube of polyethylene, under operating conditions it is possible for the tube to be partially collapsed around mandrel 45 and yet permit the passage of discrete particles of larger dimension than the minimum flow areas in the passageways defined between the lobes 46 and the inwardly pressed wall 27. It will, of course, be obvious as a practical matter that the flow areas between the lobes or arms 46 and the wall 27 at the entrance to the variable volume tube through flange 14 will be somewhat larger than the maximum size of the particles which are to flow therethrough.

In certain applications it may be desirable to taper the arms 46 of mandrel 45 adjacent the entrance and exit ends in a longitudinal direction so that larger particles may be passed through the enlarged flow paths between the arms and the flexible wall. By such an arrangement as well as with the arrangement shown in Fig. 1, it is possible with tube 27 partially compressed around the arms of the mandrel for material containing particles which are actually larger in cross-sectional area than the minimum area of the flow passages to flow therethrough without damage to the particles. This action is accomplished by constructing tube 27 of materials sufficiently limp so that the wall may be radially deformed outwardly between adjacent arms to enlarge the passageways from the position shown in Fig. 3. It is also possible for one passage to be enlarged by particles passing therethrough while the remaining passages may decrease in size by the wall being drawn taut across other lobes of the mandrel.

Another advantage of the foregoing arrangement is that upon application of a high external pressure, the flow passages will close even though filled with discrete particles. The limp-walled tube in moving against the mandrel will displace the particles into zones on either side of the regions in which contact is made with mandrel 45.

Since completely limp materials generally will not stand much abrasion and may not hold air pressure for long periods, the material and wall thickness of the tube are usually chosen for a particular installation on a compromise basis to achieve a minimum of product degradation and still have a long tube life.

In further assurance that there will be no abrupt changes in cross-sectional area through tube 27 in introducing and withdrawing the particle-containing, emulsified or aerated material, the entrance pipe 11 and exhaust pipe 61, which are interconnected by flexible wall 27, are preferably provided with tapered, conical ends 15 and 65 respectively, which engage comparable conical seats formed respectively in the end flanges 14 and 32. The pipes 11 and 61 may be secured to flanges 14 and 32 respectively by any suitable means such as the unions or coupling members 12 and 62.

As mentioned hereinabove, uniform pressure applied to flexible wall 27 is primarily under control of valve 40. Fluid pressure, such as compressed air, is introduced by way of pipe 55 through valve 40, pipe 39 and threaded coupling 37, secured to the outer housing wall 20 surrounding variable volume tube 27. However, in starting and stopping flow through the apparatus by inwardly and outwardly smoothly deforming flexible tube 27 around the lobes 46 of mandrel 45 throughout its length, it is desirable to be able to vary the pressure within the surrounding chamber over a wide range. For this reason a control valve 42 is connected through an appropriate connection such as coupling 38 secured to wall 20 so that pressure within housing 20 may be bled to the atmosphere. By such provision, valve 42 forms a relief valve which may be utilized to control the pressure within chamber 20. While the valve 42 has been shown as being of globe type, a pop-off or pressure-relieving valve means may be used so that upon a predetermined rise in pressure within the housing 20, due to the pressure within flexible wall 27 rising to degree sufficient to compress the fluid in housing 20 above a desired amount, the pressure surrounding flexible wall 27 may be relieved without damage to the wall or the enclosure, including enclosing tube 25 or the housing 20.

In operation of the arrangement of Fig. 1 to perform the method of the present invention, it is to be understood that the compressible, work-sensitive or particle-containing material is delivered through pipe 11. The length and diameter of pipe 11 may be selected to impose a desired amount of resistance to flow and thereby develop a portion of the desired back pressure, dependent upon the length and volume of pipe 11. However, in the preferred form of the invention as illustrated in Fig. 1, the length and diameter of tube 11 is short and the entire back pressure is desirably developed by flexible tube 27 whose undistorted length and volume is selected to represent from approximately one-third to two-thirds of the desired back pressure.

The remainder of the desired back pressure, which may be of any desired magnitude, is attained by adjusting the ratio of the length and flow area of tube 27. As the ratio is increased, so is the back pressure. The ratio is increased by varying the flow area which occurs not at a single point or abruptly, but which gradually changes from the region of entry into tube 27 throughout the length thereof. Thus, the flow passage is circumferentially and axially varied and uniformly throughout the length of the tube in avoidance of localized turbulence to insure continued stream-lined or laminar flow of the products passing therethrough whether the area of the flow passage be quite small or quite large.

The required predetermined back pressure resulting from a flow passage of given area with respect to the length of tube 27 is readily attained by the application of a fluid pressure to the external wall of tube 27. The valve 40 controls from a source of fluid pressure through pipe 55 the application of that pressure to tube 27. By opening valve 40 the pressure on the tube 27 will be increased and can be read directly from pressure gauge 41. If it is desired to decrease the pressure, valve 42 is provided for that purpose. In the absence of a flowing stream within tube 27, the application to its external surface of a superatmospheric pressure will cause the tube 27 to move toward the arms 46 of mandrel 45, as shown in Fig. 4. Besides closing the passages throughout the long length of tube 27, it will be seen that as the fluid stream enters through pipe 11 and into tube 27, a pressure on the stream exceeding that established within the housing 20 will progress axially of the tube and gradually move outward the wall of tube 27 extending circumferentially about radial lobes 46 to positions intermediate those shown in Figs. 3 and 4.

With the stream flowing through the tube 27 and with valves 40 and 42 closed, a predetermined back pressure will be maintained. For example, if the flowing stream has a viscosity which changes with temperature, it will be seen that with a decrease in viscosity there will be a decrease in the back pressure. Since the position of the wall of tube 27 depends upon the differential of the pressure externally and internally thereof, it will be seen that with a decrease in viscosity the external pressure will be relatively greater and thus, the wall of tube 27 will move inwardly until the back pressure is returned to its predetermined value. Conversely, with increase of viscosity and a rise in back pressure, the wall 27 will be moved outwardly slightly to increase the area of the flow passage and by an amount which will again bring the back pressure to its predetermined value.

Since it is the differential of pressure on the respective sides of the tube 27 which predetermines the area of the flow passage and the back pressure developed, it will be seen that the apparatus as a whole may be connected to a system operating at subatmospheric pressure, in which case there would be retained the differential of pressure as between the external and internal surfaces of wall 27.

From the foregoing it will be seen that the present invention adds great flexibility to a system over and above that which can be attained with tubes of fixed length and fixed volume. Flow devices of that type are not flexible and cannot be readily adjusted without change of length of the tube to vary the resistance to flow as is frequently necessary in bringing a particular product "on stream" after a shutdown.

As a result of the stream-lined character of the variable volume flow controller and the ability of the flexible wall to be bodily moved, it will be seen that it is particularly useful in the handling of products including discrete particles which are subject to degradation or destruction if subjected to abrasion of any kind. Since the chamber outside of tube 27 is sealed (when valves 40 and 42 are closed) it is preferred that the pressure exerted on the tube 27 be gaseous, compressed air being quite satisfactory. In any event, the fluid should be compressible so that the wall of tube 27 may be moved in response to pressure applied against it by the discrete particles. By utilizing the compressible fluid there is also obtained the self-regulation of the back pressure as above described in connection with the changing viscosity of the flowing stream. In this connection it is to be noted that with a compressible fluid, if there is a loss in pressure on the flowing stream, the walls of tube 27 will be moved to the position of Fig. 4 effectively to close the flow passage and prevent undesired flow of the product frequently referred to as "purging."

While valves 40 and 42 need only be manipulated during the time wide changes in volume of the flow paths through tube 27 are desired, it is within the scope of the present invention to regulate the pressure of tube 27 as by automatic adjustment of the valve 40.

The performance of the tube 27 serving as a regulating section in the flow path from tube 11 to outlet 61 in handling such diversified materials as aerated marshmallow and soups with discrete particles including potato cubes makes possible the sterilization of such food products in continuous flow through a heating unit which can be maintained at sufficiently high pressure for the attainment of the sterilization temperature without boiling; thence through a cooling zone for the lowering of the temperature to a point where the pressure may be reduced to atmospheric without boiling, or degradation of product. The regulating section on the downstream side of the cooling zone accomplishes the necessary control of the pressures both within the cooling and sterilization zones and provides accurate control of the pressures therein by close regulation of the pressure exerted upon the exterior of the tube 27.

Various changes and modifications in both the method and apparatus will occur to those skilled in the art in view of the present invention without departing from the teachings herein contained. Among such changes, it is to be noted that the enclosure surrounding flexible wall 27 may be constructed of a single outer housing 20. However, in such an arrangement, the outer diameter of wall 27 will approach more closely the inner diameter of housing wall 20 to prevent rupture of tube 27 upon a sudden increase in product pressure as compared to the pressure in housing 20.

While other changes and modifications will be suggested to those skilled in the art by the foregoing specification, all such modifications and changes as fall within the scope of the appended claims are intended to be embraced thereby.

What is claimed is:

1. The method of maintaining uniform flow resistance upon a flowing stream with changing viscosity of the stream which comprises subdividing the stream into a plurality of elongated flow paths of fixed length at least four times greater than their diameter, applying a pressure to the stream to force it through said flow paths, restricting said flow paths by exposing each said flow path to the same confined volume of a compressible fluid under a predetermined pressure, said pressure acting upon each said flow path in a direction uniformly to diminish the cross-sectional area of said flow paths throughout their respective lengths, the cross-sectional area throughout the lengths of each of said flow paths increasing and decreasing with increase and decrease of the viscosity of the flowing stream and with related change of pressure applied by the flowing stream to each said flow path.

2. The method of maintaining uniform flow resistance upon a flowing stream containing pressure-sensitive material comprised of discrete particles without degradation of said particles which comprises subdividing the stream into a plurality of elongated flow paths of fixed length at least four times greater than their diameter, applying a pressure to the stream to force it through said flow paths, restricting said flow paths by exposing each said flow path to the same confined volume of a compressible fluid under a predetermined pressure, said pressure acting upon said flow paths in directions tending uniformly to diminish their cross-sectional area, the cross-sectional area of each of said flow paths increasing and decreasing with increase and decrease of the viscosity of the flowing stream and with the related change of pressure applied by the flowing stream to said flow paths.

3. For use in combination with apparatus for treating material under pressure having means for applying pressure to material to force it along a flow path, a self-regulating back-pressure controller comprising a flow channel having a flexible wall of fixed length which is at least four times greater than its diameter, a mandrel disposed within said flow channel having a plurality of radially extending arms to divide the flow through said flow channel into a plurality of separate parallel flow paths, a pressure-tight enclosure coextensive with the major length of said flow channel and external thereto, said flexible wall being common to said flow channel and said enclosure, means for maintaining within said enclosure a compressible fluid under a predetermined pressure acting upon said wall in a direction to reduce throughout said major length thereof the cross-sectional area of said flow paths, the pressure applied to the material to force it through said flow paths acting on said wall to oppose said pressure of said compressible fluid, said wall moving simultaneously to change the cross-sectional area of each of said flow paths with change in said applied pressure to increase the said cross-sectional area of said flow paths with increase of pressure on said material and to decrease it with decrease of pressure on said material.

4. For use in combination with apparatus for treating material under pressure having means for applying pressure to material to force it along a flow path, a self-regulating back-pressure controller comprising a flow channel having a fixed length which is at least four times greater than its diameter and including a flexible wall, a mandrel disposed within said flow channel having a plurality of radially extending arms to divide the flow through said flow channel into a plurality of parallel flow paths, a pressure-tight enclosure coextensive with the major length of said flow channel and external thereto, said flexible wall being common to said flow channel and said enclosure, means for maintaining within said enclosure a compressible fluid under a predetermined pressure acting upon said wall of said flow channel to reduce throughout said major length thereof the cross-sectional area of said flow channel, a perforated enclosure within said pressure-tight enclosure which permits free passage of said compressible fluid therethrough and establishes an outward limit of travel of said flexible wall thereby fixing the maximum cross-sectional area of each of said flow paths, and the pressure applied to the material to force it through said flow paths acting on said wall to oppose said pressure of said compressible fluid, said wall moving simultaneously to change the cross-sectional area of each of said flow paths with change in said applied pressure to increase the said cross-sectional area of said flow paths with increase of pressure on said material and to decrease it with decrease of pressure on said material.

5. The combination set forth in claim 4 in which said flexible wall is cylindrical and substantially inelastic and in which said mandrel has a cross-section and a shape such that said flexible wall may throughout the major portion of its length move into intimate engagement with the whole circumferential area throughout substantially all of said length thereof to provide closure of said flow channel from substantially one end to the other end thereof.

6. The combination as set forth in claim 4 in which said mandrel is in the shape of a cruciform with the dimensions from the axis to each arm thereof substantially the same as the radius of the cylindrical flexible wall.

7. The invention as defined in claim 5 wherein said mandrel is provided with a plurality of lobes and in which the surface circumferentially thereof is smoothly curved, the distance from the center of the mandrel to the end of each lobe being substantially equal to the radius of the cylindrical flexible wall to subdivide the flow passage through the tube into subdivisions corresponding in number with the number of lobes on the mandrel.

8. A back-pressure controlling valve comprising a readily collapsible, circular cross-section tubular element having a length at least four times its diameter, conduit means for connecting the inlet end of said element with a material treatment zone, in which the back pressure upon the material is to be controlled, enclosure means surrounding said tubular element for substantially its entire length defining a space for fluid under pressure, said enclosure means having an internal cylindrical surface disposed in close proximity to the external surface of the tubular element, means for maintaining a substantially constant pressure upon fluid in said space, and an internal support element disposed within said tubular element for supporting same when collapsed, said support element likewise extending substantially the full length of said tubular element and having a non-circular cross-section of substantially the same length periphery as the internal circumference of the tubular element, said support element and the tubular element defining a plurality of passageways of variable cross-sectional area, and the flow areas of said passageways being automatically adjustable in direct response to variations in back pressure to alter the rate of material flow through said conduit means from said zone to maintain a substantially constant back pressure on the material in said zone.

References Cited in the file of this patent

UNITED STATES PATENTS

| 220,559 | Wilson | Oct. 4, 1879 |
| 994,167 | Koppitz | June 6, 1911 |
| 1,534,091 | Swoot | Apr. 21, 1925 |
| 1,881,200 | Leask | Oct. 4, 1932 |
| 1,975,937 | Graham | Oct. 9, 1934 |
| 2,042,860 | Peabody | June 2, 1936 |
| 2,176,355 | Otis | Oct. 17, 1939 |
| 2,207,149 | Held | July 9, 1940 |
| 2,353,143 | Bryant | July 11, 1944 |
| 2,448,118 | Pellettere | Aug. 31, 1948 |
| 2,467,150 | Nordell | Apr. 12, 1949 |
| 2,573,712 | Kallam | Nov. 6, 1951 |
| 2,598,307 | Rutgers | May 27, 1952 |
| 2,622,620 | Annin | Dec. 23, 1952 |

FOREIGN PATENTS

| 179,538 | Germany | Dec. 7, 1906 |
| 462,512 | Canada | Jan. 17, 1950 |